US005253072A

United States Patent [19]

Kwon

[11] Patent Number: 5,253,072

[45] Date of Patent: Oct. 12, 1993

[54] DEVICE FOR FIXING A MICROPHONE ON A VIDEO CAMERA

[75] Inventor: Byoung-Il Kwon, Kyounggi, Rep. of Korea

[73] Assignee: SamSung Electronics Co., Ltd., Suwon, Rep. of Korea

[21] Appl. No.: 783,162

[22] Filed: Oct. 28, 1991

[30] Foreign Application Priority Data

Dec. 6, 1990 [KR] Rep. of Korea .......... 1990-19173[U]

[51] Int. Cl.⁵ ............ H04N 5/30

[52] U.S. Cl. ............ 358/229; 358/209; 248/316.2

[58] Field of Search ............ 358/229, 209; 354/292, 354/293, 295; 352/31, 34, 242, 243; 248/229, 316.2, 316.6; 24/285, 279, 514

[56] References Cited

U.S. PATENT DOCUMENTS 1,509,022 9/1924 Noble ............ 24/285
3,331,111 7/1967 Carver ............ 24/514
3,361,403 2/1968 Oeler et al. ............ 24/279
4,466,589 8/1984 Leonardo ............ 248/61
4,568,115 2/1986 Zimmerly ............ 285/411
4,739,542 4/1988 Krzesicki ............ 24/285

*Primary Examiner*—Michael T. Razavi
*Assistant Examiner*—Tuan V. Ho
*Attorney, Agent, or Firm*—Robert E. Bushnell

[57] ABSTRACT

A device for fixing a microphone on a video camera including a fixed holder with a groove fixed to the camera, and a corresponding stepped microphone holder with a groove being connected to the fixed holder to thereby turn on a hinge pin. A U-shaped cut is formed on a side of a stepped portion of the microphone holder 4, and locking means with a knob, a threaded shaft and a cushion barrel lock the microphone holder. The threaded shaft is connected to the fixed holder so as to turn on a hinge pin, a spring flat resiliently supports the knob, a guide spring and a bolt are connected to one end of the spring flat, in an upper portion of the stepped microphone holder.

6 Claims, 2 Drawing Sheets

DEVICE FOR FIXING A MICROPHONE ON A VIDEO CAMERA

BACKGROUND OF THE INVENTION

The present invention relates to an adjustable device to mount a microphone to a video camera.

Generally a microphone is attached to a video camera in use to couple a image signal with a sound signal so as to secure a vivid expression of the scene.

As shown in FIGS. 1 and 2, a conventional device for attaching a microphone on a video camera has a microphone holder 21 with an inside groove 25 and an adjustable bolt with a knob 22, which is assembled to a corresponding holder 20 with a corresponding groove 24 and a bolt hole. The microphone holder 21 is turned on a hinge pin 27 after unscrewing the adjusting bolt with a knob 22. The adjustable bolt 22 is used to tighten the microphone holder 21 and the holder 20 together with the microphone.

In this conventional adjustable device, the microphone holder 21 is turned on a hinge pin 27 by loosening the threaded bolt with a knob 22. Thereafter, the microphone is inserted into the groove 24 and clamped by turning the microphone holder 21 counterclockwise and screwing the adjusting bolt 22 to the bolt hole. When assembling them, a pair of pad 23 and 26 presses the microphone to prevent it from sliding off and receiving scratches on the surface of the microphone.

However, the threaded bolt 22 is apt to be loosen by a series of shocks and vibrations commonly occurred while the video camera is in use; and accordingly the loosen microphone often creates noise to be mixed with a sound signal. Moreover, the conventional fixing device also requires greater amount of time to mount the microphone.

SUMMARY OF THE INVENTION

Therefore an object of the invention is to provide a new adjustable device and related parts to mount a microphone on a video camera.

Another object of the invention is to provide a video camera wherein a microphone is fixed firmly so as not to be shaken and is detached and attached easily and speedily.

According to the present invention, a device for attaching a microphone on a video camera has a fixed holder with a groove, attached to the camera, a corresponding stepped microphone holder with a groove connected to the fixed holder so as to turn on a hinge pin. A U-shaped cut is formed on a side of a stepped portion of the microphone holder 4, and locking means for locking the microphone holder, the locking means has a knob, a threaded shaft and a cushion barrel. The threaded shaft is connected to the fixed holder so as to turn on a hinge pin, a spring flat resiliently supports the knob, and a guide spring and a bolt are connected to one end of the spring flat, in an upper portion of the stepped microphone holder.

The present invention will now be described more specifically with reference to the drawings attached only by way of example.

BRIEF DESCRIPTION OF DRAWINGS

For a better understanding of the invention and to show how the same may be carried into effect, reference will now be made, by way of example, to the accompanying diagrammatic drawings, in which.

DETAILED DESCRIPTION OF CERTAIN PREFERRED EMBODIMENT

Figure 1:
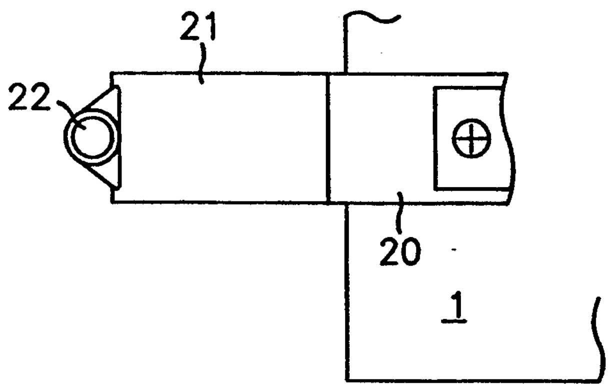
(PRIOR ART) FIG. 1
FIG. 1 is a plane view of a conventional microphone bracket.
Figure 2:
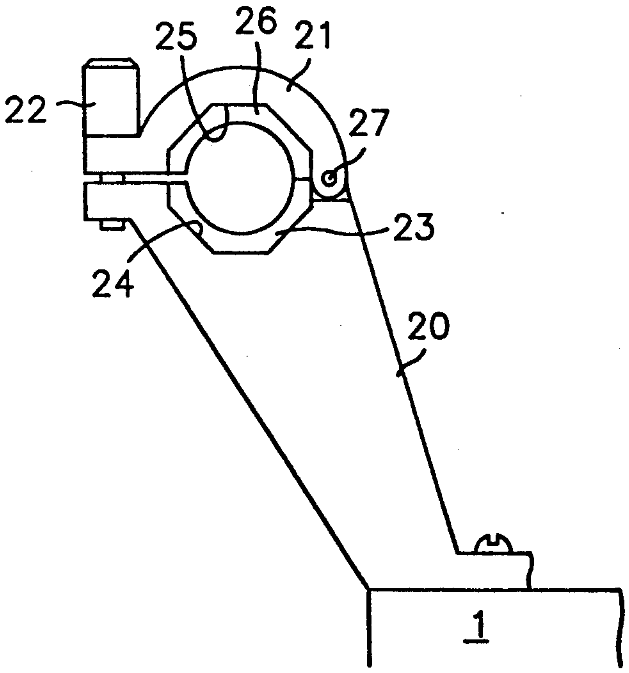
(PRIOR ART) FIG. 2
FIG. 2 is a side view of a conventional microphone bracket.
Figure 3:
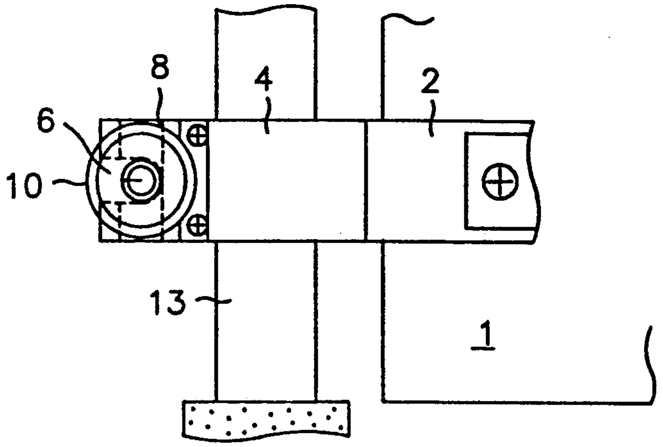
FIG. 3 is a plane view of a microphone bracket constructed according to the principles of the present invention.
Figure 4:
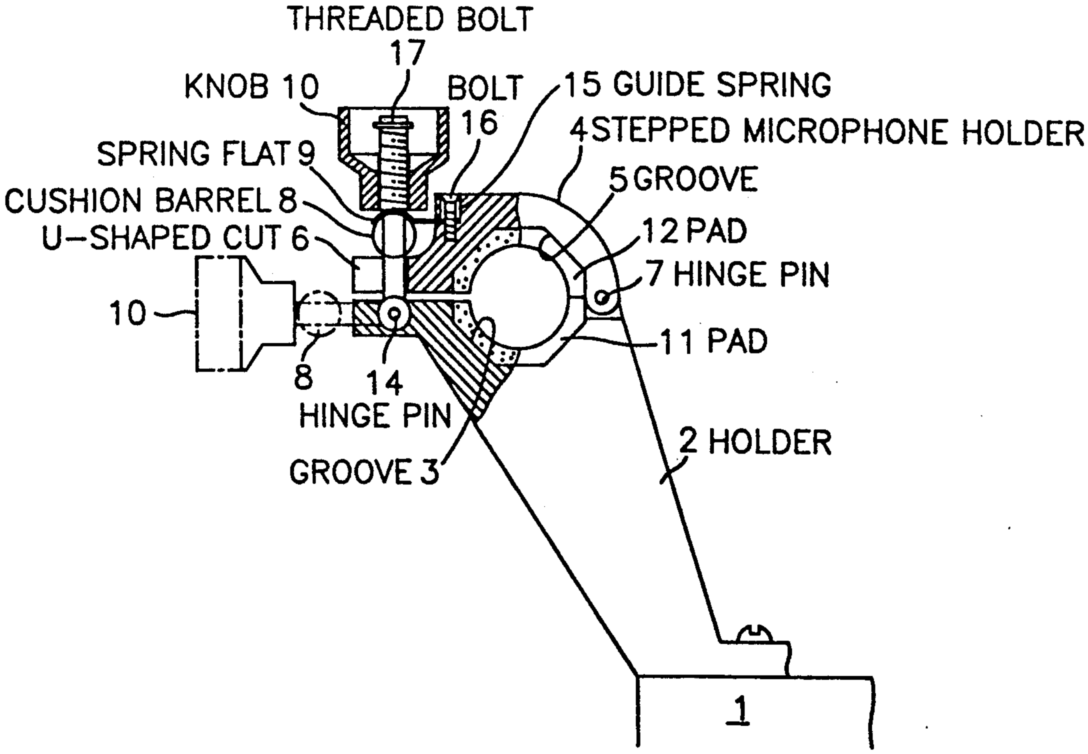
FIG. 4 is a side view of the inventive microphone bracket shown in FIG. 3.

Referring to FIGS. 3 and 4, this inventive microphone fixing bracket has a holder 2 with a groove 3 mounted on a camera and a corresponding stepped microphone holder 4 with a corresponding groove 5 connected to the holder 2 so as to turn on a hinge pin 7. The stepped microphone holder 4 has an U-shaped cut 6 formed on a side of its stepped portion where locking means of a knob 10, a threaded bolt 17 and a cushion barrel 8 are engaged for locking. The stepped microphone holder 4 also has a bolt 16, a guide spring 15 and a spring flat 9 set into its upper portion. The cushion barrel 8 is located under the knob 10 so as to receive the spring flat 9 between the knob 10 and the barrel 8 when locking. A pair of pads 11 and 12 inserted into the respective grooves 3 and 4 are for tightening the microphone within the cushion safely and protecting the surface of the microphone from scratches.

As illustrated above, there is provided a minute clearance between the cushion barrel 8 and the knob 10 by turning and loosening the knob slightly. Thereafter the locking means assembly formed by barr 8, 10 knob and bolt 17 slides out from the U-shaped cut 6 of the stepped microphone holder 4 by pushing and rotating the knob 10 counter-clockwise about the hinge pin 14 at 90 degrees. Opening the stepped microphone holder 4 by turning clockwise at 90 degrees, the microphone 13 is placed in the groove 3 with pad 11 and the rear portion of the microphone 13 inserted into a microphone jack. After placement, the microphone holder 4 is returned and the locking assembly 8, 10 and 17 are inserted into the U-shaped cut 6 by pulling and turning the knob 10 and the adjustable bracket becomes locked. Then the microphone 13 is tightened and set firmly by driving the knob downward so as to press the spring flat 9 and let the cushion barrel press the microphone holder 4 with a certain force. At the time, the pair of pads 11 and 12 protect the surface of the microphone from scratches and the spring flat 9 prevents the knob 10 from being apt to be loosening in case of a shock or shaking occurring during use.

In conclusion, this invention provides a video camera with a new microphone fixing device to prevent the microphone from being shaken or from trembling while, and to enable attachment and detachment of the microphone to and from a camera speedily.

While the invention has been particularly shown and described with reference to a preferred embodiment, it will be understood by those skilled in the art that modifications in detail may be made without departing from the spirit and scope of the invention.

What is claimed is:

1. A device for securing a microphone on a video camera, comprising:

a fixed holder having a circumferential groove adapted to secure said microphone, said fixed holder being attachable to a body of said video camera;

a stepped microphone holder having a circumferential complementary groove adapted to secure said microphone, said stepped microphone holder being pivotally mounted at one end of said fixed holder by a first hinge pin for enabling said stepped microphone holder to rotate about said first hinge pin;

an U-shaped recess formed on a stepped portion at a second end of said stepped microphone holder;

locking means for locking said stepped microphone holder with said fixed holder, said locking means having a knob, a threaded shaft and a cushion barrel, said threaded shaft being pivotally mounted at a second end of said fixed holder by a second hinge pin enabling said locking means to rotate about said second hinge pin;

a spring flat for resiliently supporting said knob;

a guide spring being connected to one end of said spring flat in an upper portion of said second end of said stepped microphone holder; and means for securing said one end of the spring flat in said upper portion of said stepped microphone holder.

2. A microphone holder for a video camera, comprising:

a first holder attached to a body of said video camera having a first internal groove adapted to secure a microphone;

a second holder pivotally mounted at a first end of said first holder having a second internal groove adapted to secure said microphone and an U-shaped recess within a stepped region of an outermost end, said first and second internal grooves forming a circular band adapted to encircle said microphone;

locking means pivotally mounted at a second end of said first holder, for enabling said first and second internal grooves to secure said microphone, said locking mechanism comprising a threaded shaft supporting an intermediate protrusion and a knob rotatably mounted on a distal end of said shaft;

a spring flat for resiliently supporting said knob while said locking means is loosely positioned within said U-shaped recess; and means for securing one end of said spring flat onto an upper region of said outermost end of said second holder.

3. A microphone holder for a video camera, comprising:

a base attached to a body of said video camera having a first substantially semi-circular groove adapted to secure a microphone;

a holder pivotally mounted at one end of said base having a second substantially semi-circular groove adapted to secure said microphone, said holder having an U-shaped recess formed at a lower region of an outermost end, said first and second substantially semi-circular grooves encircling the microphone as said holder pivots at said one end of said base;

securing means pivotally mounted at a second end of said base, for securing the microphone between said groove of said base and said groove of said holder;

spring flat means for resiliently supporting said securing means while said securing means is positioned within said U-shaped recess; and means disposed to connect one end of said spring flat means onto an upper region of said outermost end of said holder, for enabling said spring flat means to resiliently support said securing means while said securing means is positioned within said U-shaped recess, said securing means comprising means for rotating around said second end of said base and into said U-shaped recess to engage said holder and for drawing said second end of said base toward said outermost end of said holder, an elongate member having a length between said second end of said base, a first protrusion extending transversely to said length at a location intermediate said U-shaped recess and said spring flat means, and a second protrusion extending transversely to said length at a distal end of said length.

4. The holder of claim 3, further comprised of said spring flat means engaging said first protrusion while said elongate member is within said U-shaped recess.

5. The holder of claim 3, further comprised of said second protrusion being adjustably connected to said elongate member to force said first protrusion against said lower region of said outermost end in response to relative movement between said second protrusion and said elongate member.

6. The holder of claim 4, further comprised of said second protrusion being adjustably connected to said elongate member to force said first protrusion against said lower region of said outermost end in response to relative movement between said second protrusion and said elongate member.

* * * * *

UNITED STATES PATENT AND TRADEMARK OFFICE

CERTIFICATE OF CORRECTION

PATENT NO. : 5,253,072
DATED : 12 October 1993
INVENTOR(S) : Byoung-Il Kwon

It is certified that error appears in the above-indentified patent and that said Letters Patent is hereby corrected as shown below:

Column 2, line 36, change "barr" to --barrel--.

Signed and Sealed this

Twenty-third Day of August, 1994

Attest:

Bruce Lehman

BRUCE LEHMAN

*Attesting Officer* — *Commissioner of Patents and Trademarks*